United States Patent
Goh et al.

(10) Patent No.: US 11,733,787 B1
(45) Date of Patent: Aug. 22, 2023

(54) INFORMATION HANDLING SYSTEM MOUSE POWER MANAGEMENT OF ILLUMINATION BASED ON CONTEXT

(71) Applicant: Dell Products L.P., Round Rock, TX (US)

(72) Inventors: Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/839,982

(22) Filed: Jun. 14, 2022

(51) Int. Cl.
*G06F 3/0354* (2013.01)
*G06F 3/038* (2013.01)

(52) U.S. Cl.
CPC .......... *G06F 3/03543* (2013.01); *G06F 3/038* (2013.01)

(58) Field of Classification Search
CPC .. G06F 3/03543; G06F 3/0354; G06F 1/3259; G06F 2203/0337; G06F 2203/0333; G06F 3/03541; G06F 1/3231; G06F 1/3203; G06F 1/3206; G06F 1/325; G06F 1/3234; G06F 1/3215; G06F 1/32; Y02D 10/00
USPC .................................................. 345/157, 163
See application file for complete search history.

(56) References Cited

U.S. PATENT DOCUMENTS

| | | | |
|---|---|---|---|
| 6,549,214 B1 | 4/2003 | Patel et al. | |
| 9,098,142 B2 | 8/2015 | Westerman et al. | |
| 9,272,215 B2 | 3/2016 | Casparian et al. | |
| 9,532,273 B2 | 12/2016 | Egner et al. | |
| 9,569,093 B2 | 2/2017 | Lipman et al. | |
| 9,804,733 B2 | 10/2017 | Walline et al. | |
| 10,254,855 B2 | 4/2019 | Lee | |
| 10,276,131 B2 | 4/2019 | Ballard et al. | |
| 10,592,007 B2 * | 3/2020 | Morier | G06F 3/0304 |
| 10,936,088 B1 * | 3/2021 | Liu | H05B 45/60 |
| 11,194,394 B2 | 12/2021 | Joseph et al. | |
| 11,372,466 B1 * | 6/2022 | Lin | G06F 1/3271 |
| 2007/0132734 A1 * | 6/2007 | Kwak | G06F 1/3259 345/166 |
| 2012/0274656 A1 | 11/2012 | Kang et al. | |
| 2012/0314133 A1 | 12/2012 | Kim | |
| 2015/0002397 A1 | 1/2015 | Song | |
| 2016/0054817 A1 | 2/2016 | Chen | |
| 2022/0100288 A1 * | 3/2022 | Chauvin | G06F 3/0383 |
| 2022/0342446 A1 | 10/2022 | Gagne-Keats et al. | |

* cited by examiner

*Primary Examiner* — Koosha Sharifi-Tafreshi
(74) *Attorney, Agent, or Firm* — Zagorin Cave LLP; Robert W. Holland

(57) ABSTRACT

An information handling system mouse includes a position sensor that detects movement and a push button that detects button press inputs for communication to an information handling system. An indicator light exposed at an upper surface of the mouse provides an indication of power state, such as by illuminating a product logo. The position sensor detects positions with a focus aided by a resolution illumination light, such as a laser. The push button detects button press inputs with a scan performed at a processing resource, such as an MCU. The processing resource configures power on and off the resolution illumination light and the indicator light based upon position sensor focus and button press inputs by an end user that predict the end user's hand position on the mouse.

19 Claims, 7 Drawing Sheets

INFORMATION HANDLING SYSTEM
MOUSE POWER MANAGEMENT OF
ILLUMINATION BASED ON CONTEXT

BACKGROUND OF THE INVENTION

Field of the Invention

The present invention relates in general to the field of portable information handling systems, and more particularly to an information handling system dual pivot hinge signal path.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, information handling systems can have a portable or stationary configuration. Stationary configurations generally are tied to a location by external resources, such as a power plug inserted in an outlet, and use external peripherals, such as a peripheral display, keyboard and mouse. Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Although portable information handling systems integrate a display and input devices, they also typically will work with external peripheral devices, such as a peripheral display, mouse and keyboard, that end user's find more convenient than the integrated display and input devices.

End users often find a peripheral mouse to be a powerful tool with a simple to understand point and click usage model. A typical end user might use a mouse in a low intensity environment, such as web surfing, or a high intensity environment such as gaming. Within a gaming application usage case, a mouse might control inputs by movement of the mouse body over a desktop surface or by clicks at an input button exposed at an upper surface of the mouse body. Mouse movements may provide varying degrees of accuracy so that small end user inputs are precisely translated to mouse cursor motion presented at a display or more loosely translated for less precise inputs. Similarly, mouse input buttons may involve rapid button press inputs, such as for use in a game to trigger a weapon firing, or just occasional presses, such as clicks to open documents or emails. A gamer may, for instance, rely on an expensive and high quality mouse to gain an edge when gaming for movement and input button presses and then use the same high precision mouse in less demanding tasks. A high end mouse can include a higher quality position sensor that detects position changes with high accuracy and robust buttons that distinguish separate inputs made in rapid succession.

One difficulty with higher precision position sensors and push buttons is that the position sensing and button press logic tend to consume increased power relative to less precise mouse devices. In some instances, the high precision position sensing is not necessary and a distraction to more germane mouse usage. Typically, a selection button on the bottom of the mouse allows an end user select whether to operate the mouse in a high precision mode or a lower precision mode so that, for instance, a gamer can use the gaming mouse both for gaming applications and more common application environments that are less demanding. Selecting less precise mouse resolution tends to have a beneficial side effect of increasing mouse battery charge life. End users tend to find selection of mouse resolution as inconvenient, especially where the end user has to turn the mouse over to find the resolution button. Another difficulty with higher precision position sensors is that presentation of the mouse cursor at a display having movement defined by the mouse position sensor resolution can vary based upon the resolution of the display showing the mouse cursor. When an information handling system presents visual images at multiple displays, the movement of the mouse cursor between the displays can disorient the end user by changing based upon the display resolution.

SUMMARY OF THE INVENTION

Therefore, a need has arisen for a system and method which manages power consumption of a mouse having selectable input sensitivity.

A further need exists for a system and method that adapts mouse position sensor sensitivity as the mouse cursor moves between displays of different resolutions.

In accordance with the present invention, a system and method are provided which substantially reduce the disadvantages and problems associated with previous methods and systems for managing power consumption at a peripheral mouse device. Mouse position sensor sensitivity and/or button press sensitivity are adjusted based upon mouse usage context, such as accelerations experienced at the mouse or the time between button press inputs. Adjusting between a high power consumption operating mode that has greater power consumption, such as high position sensor sensitivity and/or rapid button press polling, provides improved mouse performance when desired while a low power consumption operating mode adequate for most tasks helps to prolong battery life when increased performance is not necessary.

In another embodiment, mouse position sensor sensitivity adapts as a mouse cursor position transitions between displays having different resolutions so that mouse movement provides consistent mouse cursor movement at each display. For example, a display scalar reports to the mouse the display resolution at activation of the mouse cursor so that the mouse processing resource can set a mouse position sensor resolution associated with the display resolution.

More specifically, an information handling system processes information with a processor that executes instructions in cooperation with a memory that stores the instructions and information, and presents the information as visual images at a display. A mouse interfaced with the information handling system has a position sensor that detects movement of the mouse and reports the movement to the information handling system for presentation as a cursor movement. The mouse position sensor detects mouse movement with a precision mode that has a greater power consumption and a non-precision mode that has a lower power consumption. The mouse includes a push button that detects end user button presses with a precision mode that has a greater polling rate with a greater power consumption and a non-precision mode that has a reduced polling and a reduced power consumption. A power manager of the mouse monitors mouse operating context to selectively adjust the mouse position sensor and push button between the precision and non-precision modes so power consumption and performance are balanced based upon end user mouse input detection needs. Other mouse functions may be adapted to manage power consumption, such as indication illumination and position sensor illumination. When reporting mouse position sensor inputs to an information handling system for presentation at plural displays, the position sensor resolution of the mouse movement detected by the position sensor is adjusted based upon the display resolution so that the mouse cursor movement created by mouse housing movement remains consistent as the mouse cursor moves at displays having different resolutions.

The present invention provides a number of important technical advantages. One example of an important technical advantage is that an information handling system mouse balance power consumption with position sensor and push button sensitivity to provide desired performance with minimal power consumption. As a result an end user gets expected performance and extended battery life for an improved end user experience. Adapting mouse resolution based upon the resolution of a display presenting a mouse cursor enhances the end user experience by keeping a consistent mouse performance when multiple displays of different resolutions are in use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system mouse manages power consumption and position sensor resolution based upon operating context. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
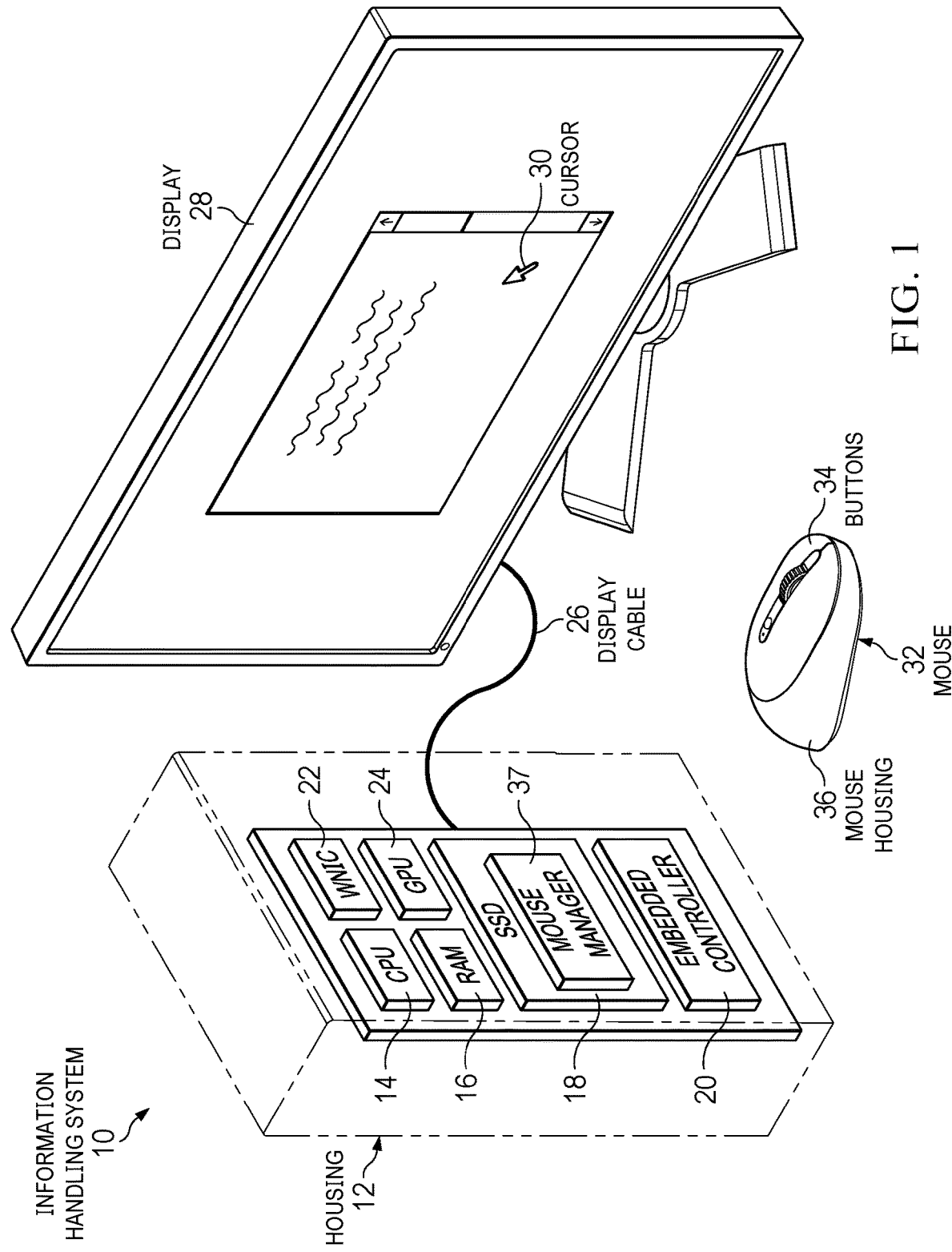
FIG. 1 depicts a block diagram of an information handling system configured to manage mouse power consumption based upon mouse usage context and mouse resolution reporting based upon mouse and display resolution.

Referring now to FIG. 1, a block diagram depicts an information handling system 10 configured to manage mouse 32 power consumption based upon mouse usage context and mouse resolution reporting based upon mouse and display resolution. In the example embodiment, information handling system has a stationary configuration built in a housing 12, such as a desktop or tower housing that couples to external power and peripherals. In alternative embodiments, a portable information handling system may be used instead, such as for a convertible system having an integrated display, battery and keyboard. A central processing unit (CPU) 14 processes information by executing instructions of applications, such as an operating system and gaming applications. A random access memory (RAM) 16 supports CPU 14 by storing the instructions and information for access by CPU 14. A solid state drive (SSD) 18 provides persistent storage of the instructions and information, such as with flash memory that is read at power up to RAM 16 for execution on CPU 14. An embedded controller 20 interfaces with CPU 14 to manage physical devices, such as thermal conditions, application of power and interactions with peripheral devices. A wireless network interface controller (WNIC) 22 supports wireless communications, such as with WiFi and Bluetooth, with external networks and peripheral devices. A graphics processor unit (GPU) 24 interfaces with CPU 14 and further processes the information to generate visual images for presentation at a display 28, such as by defining pixel values that communicate through display cable 26 to display 28 to define colors for the array of pixels of display 28. For instance, Ultra High Definition (UHD) displays typically have an array of around 3840 horizontal pixels by 2160 vertical pixels and are also generally known as 4K displays. As another example, Quad High Definition (QHD) displays typically have an array of 2560 horizontal pixels by 1440 vertical pixels and are also generally known as 2K displays. Variations of these sizes exist that generally fall within the 2K and 4K display resolution definitions.

To aid end user interactions with content presented at display 28, a mouse cursor 30 is presented when a mouse 32 interfaces with information handling system 10. Mouse 32 may present and control cursor 30 in a variety of conventional manners. For example, mouse 32 may interface through a cable with information handling system, such as by a USB port managed by embedded controller 20. Alternatively, mouse 32 may interface through wireless signals through WNIC 22, such as Bluetooth. In some instances, mouse 32 may communicate directly with display 28, which then forwards the mouse cursor 30 positions to embedded controller 20 for use by CPU 14. Mouse 32 detects changes in position of mouse housing 36 with a position sensor disposed within and also accepts inputs through push buttons 34, sometimes referred to as right or left mouse clicks. A mouse manager 37 retrieved from non-transitory memory and executed on CPU 14 and/or embedded controller 20 manages interactions with mouse 32, such as a driver of an operating system. Positions on display 28 of mouse cursor 30 as set by movement of mouse housing 36 interact through the operating system with other applications so that presses on push buttons 34 provide inputs. As an example, a mouse click may be an input to a gaming application, such as a firing of a weapon at an object presented on display 28 at the position of mouse cursor 30. As is set forth in greater detail below, information handling system 10 and mouse 32 coordinate to manage power usage and pointing input resolution at multiple displays.

Figure 2:
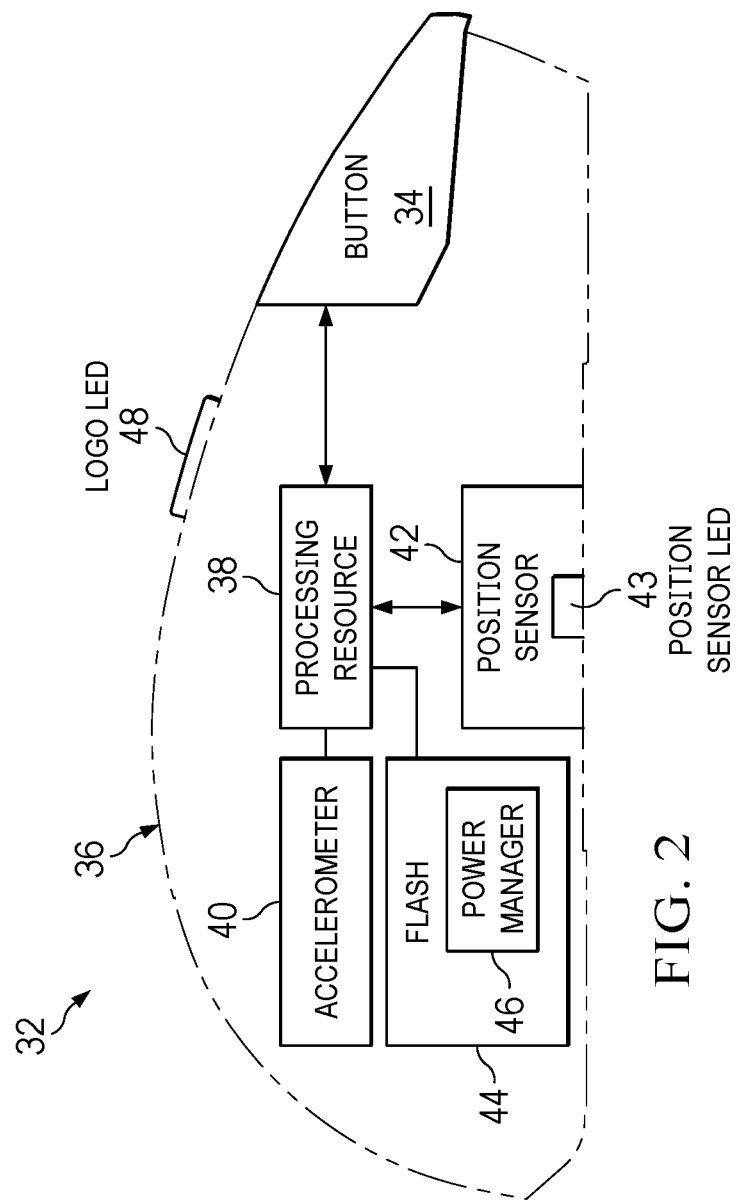
FIG. 2 depicts a block diagram of a mouse that supports power consumption management based upon mouse usage context and mouse resolution reporting based upon mouse and display resolution.

Referring now to FIG. 2, a block diagram depicts a mouse 32 that supports power consumption management based upon mouse usage context and mouse resolution reporting based upon mouse and display resolution. In the example embodiment, mouse housing 36 has a size that fits in a palm of a hand and contains a processing resource 38 that manages mouse operations, such an MCU. An accelerometer 40 interfaces with processing resource 38 to detect accelerations of mouse housing 36 and report the accelerations to processing resource 38. Push buttons 34 interface with processing resource 38, which polls for contact of the button due to a push, such as by checking a GPIO periodically based upon a timer. A position sensor 42 is exposed at a bottom surface of mouse housing 36 to detect movement of mouse 32 when resting on a support surface, such as desktop surface. For instance, position sensor 42 is an optical sensor that tracks changes in position by changes in visual images captured over time. A position sensor LED 43, such as a laser, can provide illumination for position sensor 42 to aid in capture of optical images that show position changes. For instance, position sensor LED 43 may provide illumination to help locate the support surface, such as when the mouse is lifted up and away from the support surface or when high precision is desired and extra illumination helps enhance position sensor accuracy. A flash memory 44 or other non-transitory memory, stores instructions that execute on processing resource 38 to detect mouse inputs and report the mouse inputs to an information handling system. In the example embodiment, flash memory 44 stores a power manager 46 that executes on processing resource 38 to manage power use of mouse 32. An indicator illumination LED 48, such as to illuminate a product logo at the mouse upper surface, or other illumination source provides an illumination indicator at the upper surface of mouse 32, such as a visual indication that the mouse is on.

By reference to FIGS. 1 and 2, power and position reporting are managed at mouse 32 to adapt to a context of the mouse usage. With respect to power management, mouse manager 37 and power manager 46 cooperate to adjust mouse position sensor, push button polling and light illumination so that battery discharge is efficiently applied to achieve end user performance. Position sensor 42, for example may detect changes in position of the mouse housing with various degrees of precision, such as by increasing the sample rate at the position sensor, increasing or applying illumination at the position sensor to improve sensitivity, performing a more detailed analysis of information captured by the position sensor by dedicating more processing resources to position sensing, and increasing wireless communications of position changes. Push button 34, as another example, can more precisely differentiate rapid push button inputs by monitoring the push button contact with more frequent polling by processing resource 38. Illumination at indicator illumination LED 48 and position sensor LED 43 provide another pathway for power management by limiting illumination, for instance, when indicator illumination LED 48 is covered by an end user hand or position sensor 43 is too distant to a support surface to be effective for increasing position detection or unnecessary for a selected position sensor sensitivity. Processing resource 38 manages power consumption in balance against mouse usage context by selectively adjusting position sensor sensitivity, push button sensitivity and illumination settings.

In one example embodiment, position sensor and push button sensitivities each have high, low and off power states. A high power consumption state of the position sensor detects position changes with a high accuracy, such as by increased sampling and illumination; a low power consumption state detects position changes with a low accuracy, such as by a reduced sample rate and without illumination; and an off power state powers down the position sensor to reduce power consumption to zero or near zero. A power consumption state of the push button detects button presses with a high polling rate of the processing resource that distinguishes button pushes with greater accuracy at a high processing cycle and power use; a low power consumption having a lower polling rate of the processing resource that is less accurate at distinguishing push button inputs at a lower processing cycle and power use; and an off power consumption in which the processing resource does not poll for push button inputs and may sleep. One manner to manage power consumption state is by monitoring of accelerations by accelerometer 40. For instance, when high or frequent accelerations are detected, a high power consumption mode is commanded, and when the mouse housing movements are smaller and less frequent a low power consumption mode is commanded. Another manner to manage power consumption state is by tracking how often mouse push button press inputs are detected so that more frequent presses results in greater polling and less frequent presses results in less polling. In one embodiment, the position sensor and push buttons may have different power consumption states based upon the context, such as having high position sensor tracking with a low push button polling and vice versa. Indicator illumination LED 48 can selectively power up and down based upon an analysis of context to determine when an end user hand is placed on the mouse upper surface, as is set forth in greater detail below.

In one alternative embodiment, power manager 46 and mouse manager 37 cooperate to analyze mouse operations for different applications so that execution of an application on information handling system 10 results in a proactive setting of the mouse to configure to a setting associated with the activity. For example, a gaming application that has a pattern of active movement and input clicks is classified as a high power consumption application that has both the position sensor and input button in a high accuracy state at initiation of the application. Monitoring of actual end user interactions at the mouse may result in changes to other power states as the end user engages in active use of the application or rests. Other gaming applications that have a pattern of rapid push button inputs, such as to fire a weapon, with less mouse movement will have an application type that initiates to high power state for polling of the input button and a low power state for position tracking. Alternatively, some gaming applications that have a pattern of rapid mouse movements with fewer push button inputs initiate to a type having high power consumption for the position sensor and a low power consumption for push button polling. When the mouse is used with non-gaming applications, such as word processing or web browsing, a type is defined to initiate in low power consumption operations for both the position sensor and the input button polling. Mouse manager 28 communicates the type of application to mouse power manager 46 for initiation at the mouse to the appropriate position sensor and polling sensitivity. Over time, power manager 46 tracks the mouse inputs to define the application type as feedback to the information handling system. Alternatively, embedded controller 20 tracks mouse cursor and input button inputs over to time to develop a type of application and stores the type of application so that the type is communicated to the mouse at power up to initiate in the appropriate sensitivity.

Figure 3:
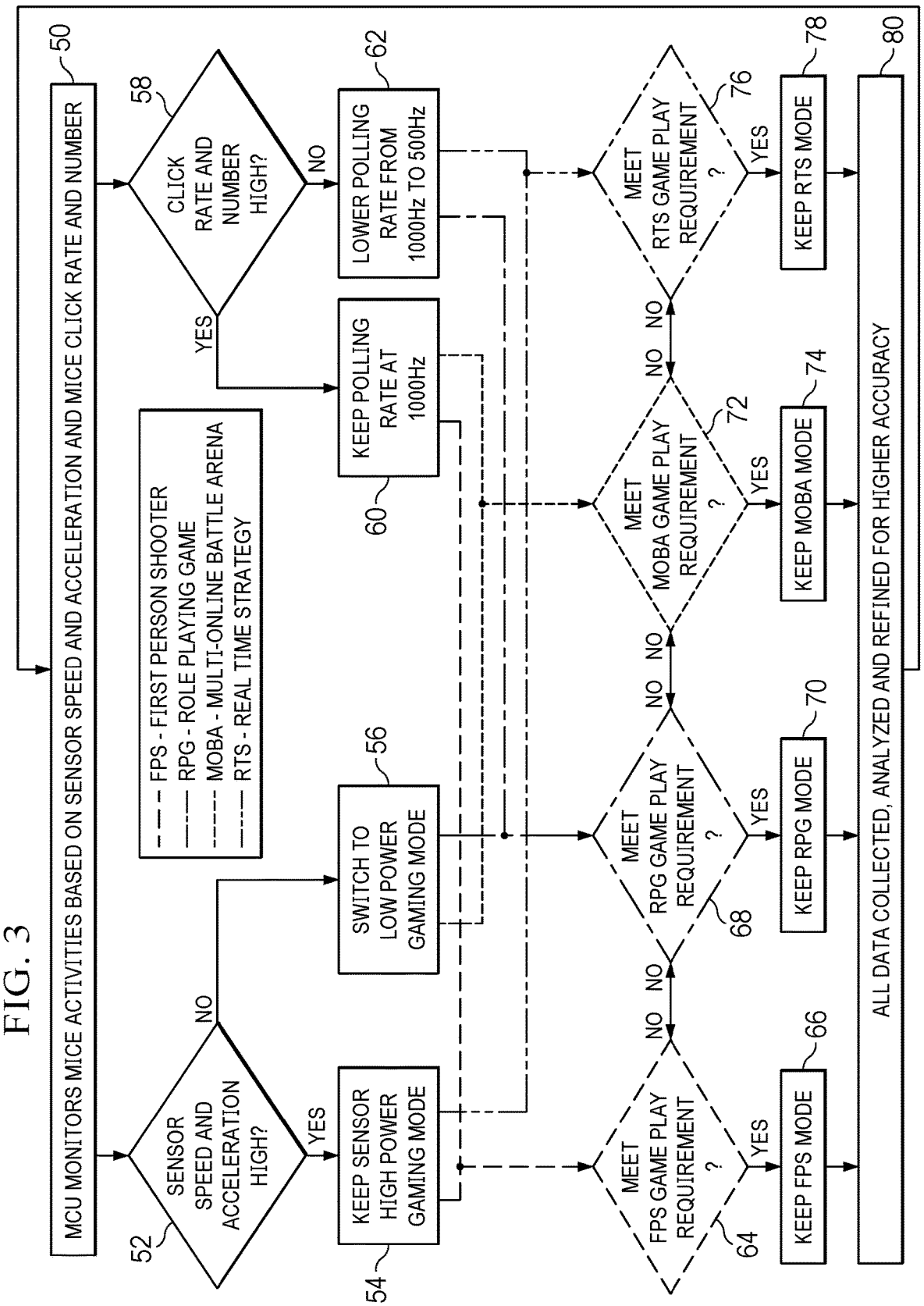
FIG. 3 depicts a flow diagram of a process for adaptive power management based upon application type.

Referring now to FIG. 3, a flow diagram depicts a process for adaptive power management based upon application type. In the example embodiment, four different application types are defined: First Person Shooter (FPS); Role Playing Game (RPG); Multi-online Battle Arena (MOBA); and Real Time Strategy (RTS). The process starts at step 50 with the processing resource, such as an MCU monitoring mouse activities based upon sensor speed and accelerations and upon mouse push button click rates and numbers. As set forth above, mouse housing movement may be tracked by an accelerometer; alternatively, position sensor inputs may be used to track the amount of mouse housing movement. At step 52 a determination is made of whether the position sensor or accelerometer have a high or low acceleration, such as with a threshold stored in an accelerometer that counts accelerations of greater than a defined amount in a defined time. If the mouse movement exceeds the threshold, the process continues to step 54 to configure the position sensor in high sensitivity and high power consumption mode. If at step 52 the mouse housing movement does not exceed the threshold, the process continues to step 56 to configure the position sensor to the low sensitivity and low power consumption. From step 50, the mouse push button inputs are monitored at step 58 to determine if the number of mouse clicks in a defined time exceeds a defined threshold. If the threshold is exceeded, the process continues to step 60 to use the high polling rate with higher power consumption, such as 1000 Hz. If the threshold is not exceeded, the process continues to step 62 to apply a lower polling rate with a lower power consumption, such as 500 to 1000 Hz.

Once the position sensor sensitivity and input button polling are determined, the process continues to steps 64, 68, 72 and 76 to assign the mouse a power management configuration based upon the position sensor and input button context determinations. From steps 54 and 60 the process continues to step 64 to determine if the application meets the FPS game play type requirement having a high position sensor sensitivity and a high input button sensitivity. If so, the process continues to step 66 to keep the FPS mode and to step 80 to collect the selection data to refine mouse power settings for future use. If at step 64 the FPS mode is not an appropriate selection, the process continues to step 68 for the determination described below. At steps 56 and 62, if the position sensor has a high sensitivity setting and the input button has a low input button sensitivity, the process continues to step 68 to determine if the context meets the RPG game play type requirement. If so, the process continues to step 70 with the RPG game play type set and to step 80 to collect and analyze the data. If the RPG game play type is not appropriate, the process continues to step 72 for the determination described below. If at step 56 and 60 the position sensor sensitivity is set low and the input button polling rate is set to high, the process continues to step 72 to determine if the MOBA game play type requirement is met. If at step 72 the MOBA game type is appropriate, the process continues to step 74 to keep the position sensor and input button settings for the MOBA mode and to step 80 to track the mouse type selection data. If at step 72 a determination is made that the MOBA game type is not appropriate, the process continues to step 76 as described below. At step 54 and 62 if the position sensor sensitivity is set high and the button polling sensitivity is set low, the process continues to step 76 to determine if the RTS game play requirement type is appropriate. If so the process continues to step 78 to keep the RTS mode and to step 80 to track the mouse type selection data. In various embodiments, a default mode of low power may be applied if an error occurs in the selection of the position sensor and input button sensitivities.

Figure 4A:
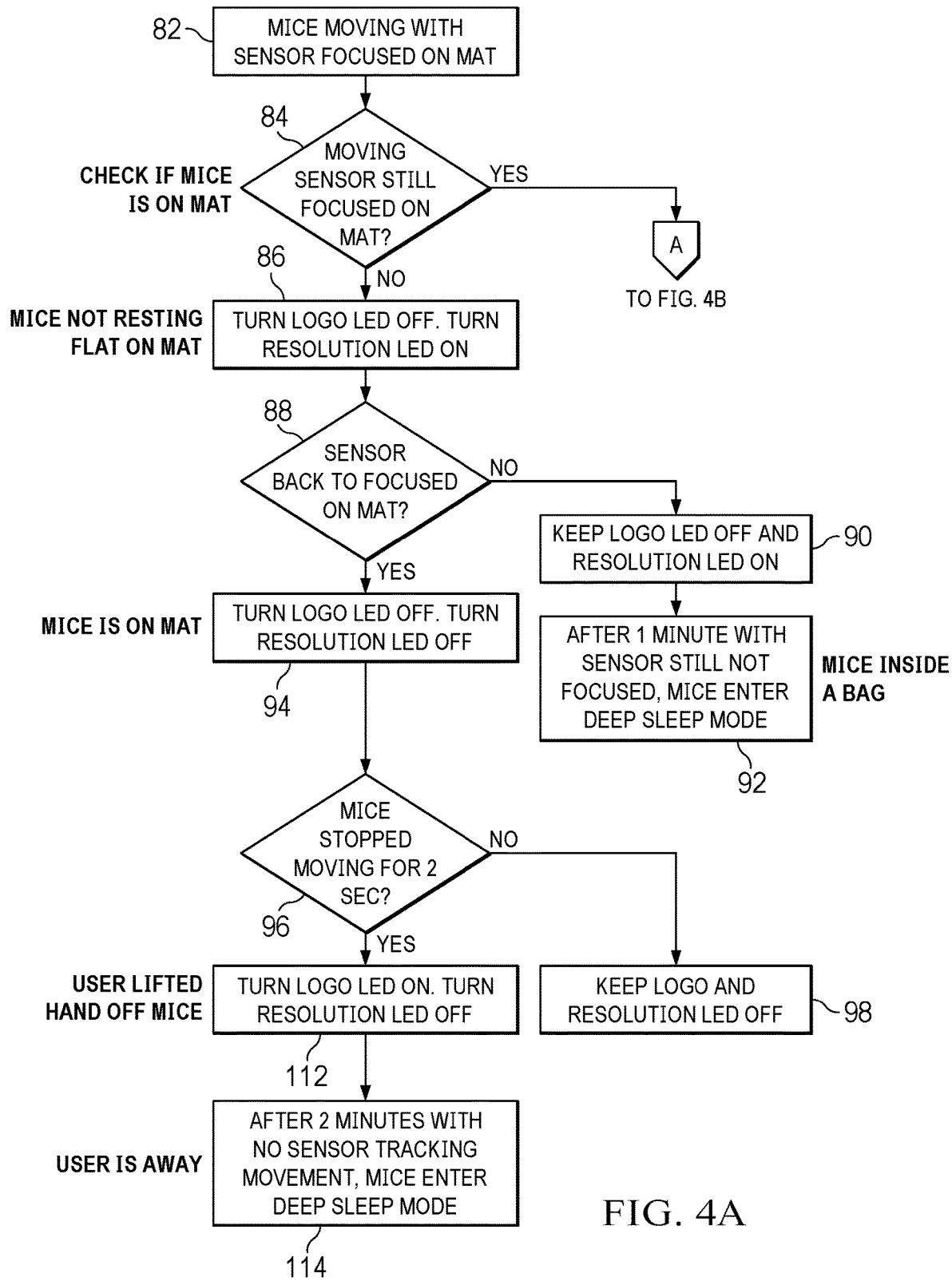
FIGS. 4A and 4B depict flow diagrams of a process for managing mouse illumination based upon context.
Figure 4B:
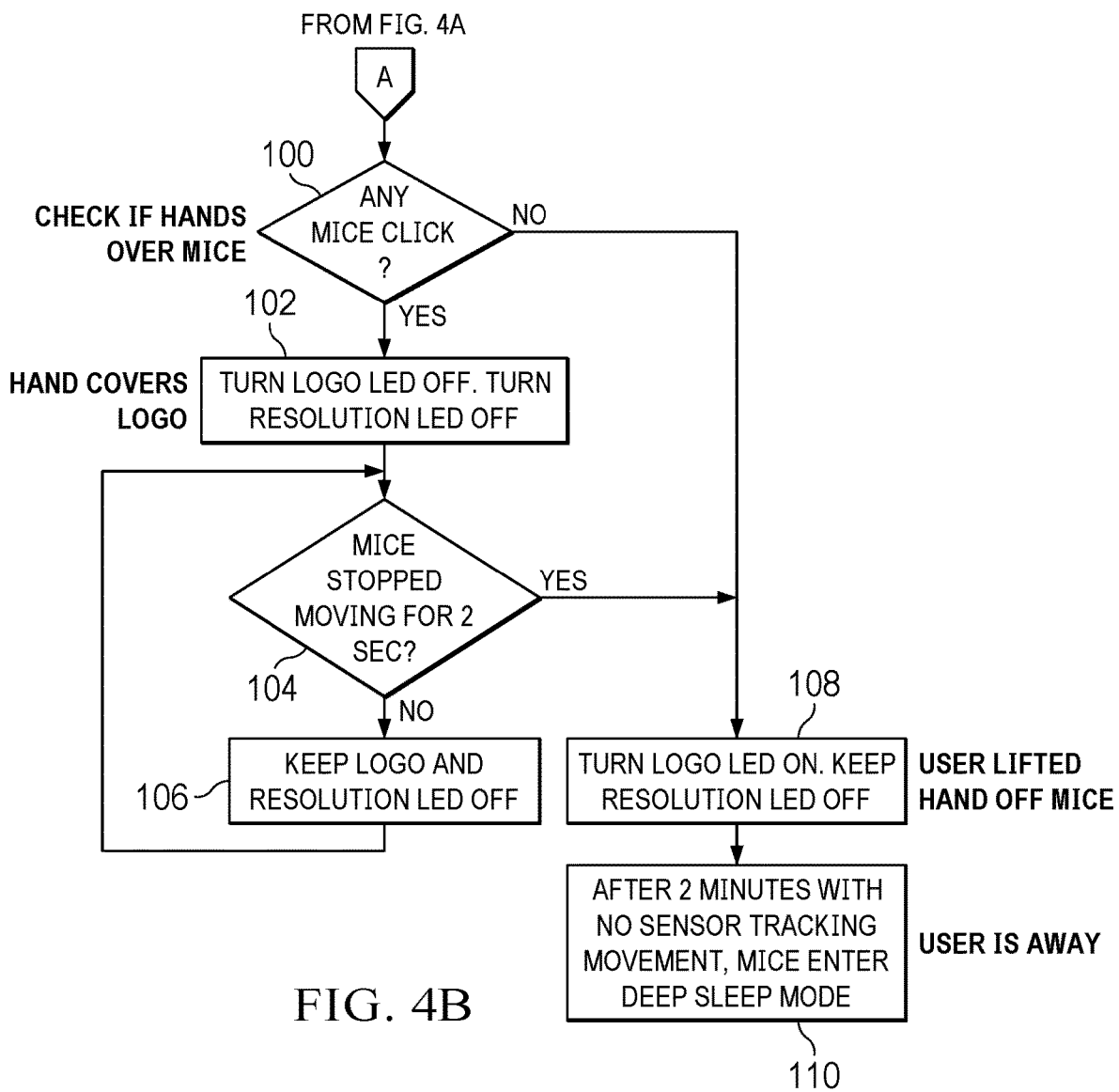

Referring now to FIGS. 4A and 4B, flow diagrams depict a process for managing mouse illumination based upon context. In the example embodiment mouse position sensor focus and mouse click inputs provide indications of mouse use that are applied to determine when the logo illumination indicator LED is covered by an end user hand and can therefore be powered off. The process starts at step 82 with the mouse moving and the position sensor focused on the mouse mat or other support surface. At step 84 a determination is made of whether the sensor continues to detect movement focused on the mouse mat or other support surface. If not, then the context indicates that the mouse is not resting on the mat or support surface and at step 86 the logo illumination indicator LED is turned off and the position sensor resolution LED is turned on. The context indicates that a hand is over the indicator LED lifting the mouse from the support surface so that turning on the position sensor resolution LED aids in locating the mat or support surface when the mouse is placed down again for use. At step 88 a determination is made of whether the position sensor has returned to within a range of the mat or support surface so that a position sensor focus can be achieved. If not, the process continues to step 90 to keep the logo indicator LED off and to turn off the position sensor resolution LED based on a context indication that the mouse has been placed in a storage location, such as bag. At step 92 after a one minute timeout, the mouse is placed in an off power state, such as a deep sleep that wakes with a sharp acceleration or button press. If at step 88 the position sensor obtains focus, the process continues to step 94 to keep the logo indicator LED turned off and to turn off the position sensor resolution LED. When the position sensor is focused after not being focused, the context suggests that the end user has lifted and placed back down the mouse. From step 94 a determination is made at step 96 whether the mouse moves position, indicating an end user hand over the indicator LED, or stops moving, indicating the end user has removed the hand. At step 98, if the mouse has not stopped moving for two seconds, the logo indicator LED and resolution LED are turned off based upon a context of active use of the mouse. If at step 96 the mouse does stop moving within the two seconds, the process continues to step 112 to turn the logo indicator LED on and the resolution LED off based upon a context that the end user has raised a hand away from the mouse but may be prepared to start using the mouse again. At step 114, after two minutes without detection of movement at the mouse, a deep sleep may be entered with the indicator and resolution LEDs off and the position sensor and processing resource in an off power state.

Returning to step 84, if the mouse is moving and the position sensor is focused on the mat or other support surface, the process continues to step 100 to determine if any mouse clicks are detected at the mouse push buttons. If mouse input button clicks are detected, such as with in a predetermined time, the process continues to step 102 to turn the logo indicator LED off and keep the resolution LED off based upon a context that the mouse is in active use with an end user hand over the mouse housing. From step 102 the process continues to step 104 to monitor the mouse movement and detect a failure to move for a period of two seconds. While movement is detected, the process continues to step 106 to keep the logo indicator light and LED resolution LED off and returns to step 104 to continue monitoring the mouse for use. At step 100 when a mouse input button click is not detected and step 104 when movement of the mouse has stopped for two seconds, the context indicates that the mouse use has ended and the end user has lifted his hand from the mouse. In response, at step 108 the logo indicator LED is turned on and the resolution LED remains off. At step 110, after two minutes of no mouse movement, the mouse enters the deep sleep mode with the processing resource and position sensor in the off state. The context derived from the mouse provides a basis for saving power from the illumination of the indicator LED when hidden by an end user.

Figure 5:
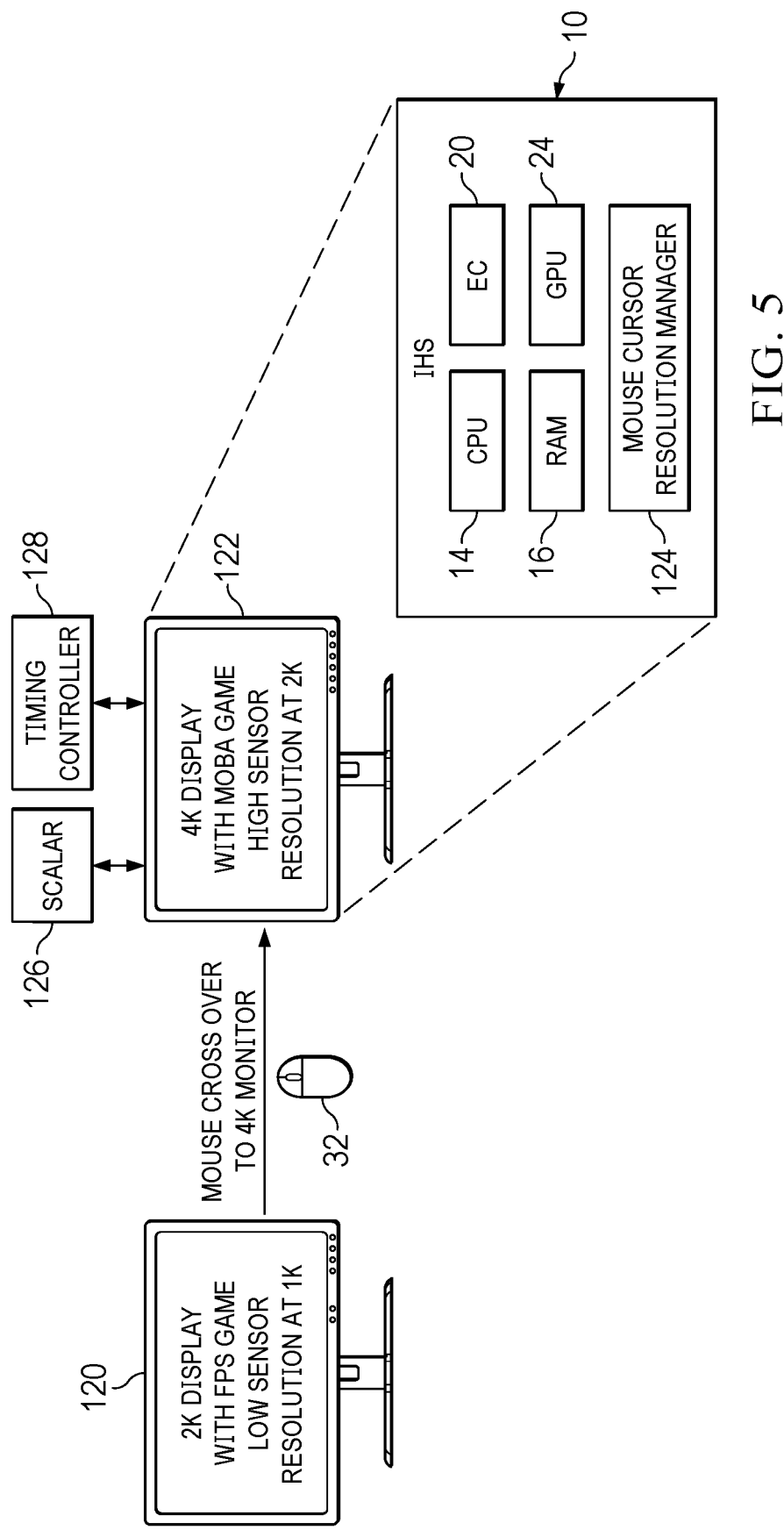
FIG. 5 depicts a block diagram of a mouse configured to adapt position sensor resolution reporting based upon display visual image presentation resolution.

Referring now to FIG. 5, a block diagram depicts a mouse configured to adapt position sensor resolution reporting based upon display visual image presentation resolution. In the example embodiment, information handling system 10 executes applications on CPU 14 and RAM 16 to generate visual images with GPU 24 for presentation at a first display 120 having 2K resolution and a second display 122 having a 4K resolution. Each of displays 120 and 122 include a timing controller 128 that scans pixel values to the display panel to define the visual images and a scalar 126 that adjusts visual images to the resolution of the display panel. Mouse 32 controls a location of presentation of a mouse cursor at each display 120 and 122 by reporting changes in position of the mouse detected by a position sensor of the mouse. In the example embodiment, mouse 32 reports position changes to embedded controller 20, which forwards the position to scalar 126 to present the mouse cursor at the appropriate location. In alternative embodiments the mouse position changes may be presented as changes to the mouse cursor position with various communication flows, such as directly from the mouse to the scalar, through a USB hub controller and through a WNIC interface. Mouse 32 has selectable resolution for detecting changes in the mouse position, such as a 1K resolution and a 2K resolution. Higher and lower resolution of mouse position changes may be selected by a manual switch on the mouse and/or configured through a user interface supported by the mouse driver. In the example embodiment, a mouse cursor resolution manager 124 stored in non-transitory memory of the information handling system and executed on CPU 14 and/or embedded controller 20.

A difficulty with selectable mouse resolution is that the position changes reported will have different mouse cursor movements at displays that have different display resolutions. To address this problem, when a scalar 126 of a display initiates a presentation of a mouse cursor, the scalar communicates the display resolution to the mouse so that the mouse can set a position sensor resolution associated with the display resolution. By way of example, first display 120 presents visual images, such as an FPS game, with a display resolution of 2K and moves the cursor with a 1K position sensor resolution; second display 122 presents visual images, such as a MOBA game, with a display resolution of 4K and moves the cursor with a 2K position sensor resolution. In this example, when the mouse cursor transitions from the 2K display to the 4K display, the mouse position sensor resolution transitions from 1K to 2K so that mouse movements provide the same mouse cursor movements at the different displays. At a transition of the mouse cursor to a different display, the scalar of the display that initiates presentation of the mouse cursor will report the display resolution to the mouse so that the mouse processing resource can automatically adjust the mouse position sensor resolution to the display resolution, such as by comparing against a table stored in non-transitory memory of the mouse that relates display resolutions and mouse resolutions. In alternative embodiments, other resources and logic may be used to adjust the mouse resolution. For instance, embedded controller 20 may act as an intermediary that commands mouse position sensor resolution based upon cursor location and display resolution reported to the embedded controller. In another alternative embodiment, the mouse may receive an initial mouse cursor position and display resolution from the display and then track position changes commanded from the mouse to estimate when the mouse cursor transitions between displays. Alternatively a similar map may be used in the embedded controller. Although the example embodiment depicts first and second peripheral displays interfaced with a stationary information handling system, in an alternative embodiment, one of the displays may be integrated in a portable information handling system so that the display resolution and cursor movement are managed between the integrated display and a peripheral display. In some instances where a large surface area discrepancy exists, such as a smaller integrated display and larger peripheral display, the mouse position sensor resolution may include a further adjustment that maintains a consistent mouse cursor movement taking in consideration both the difference in display surface area and display resolution.

Figure 6:
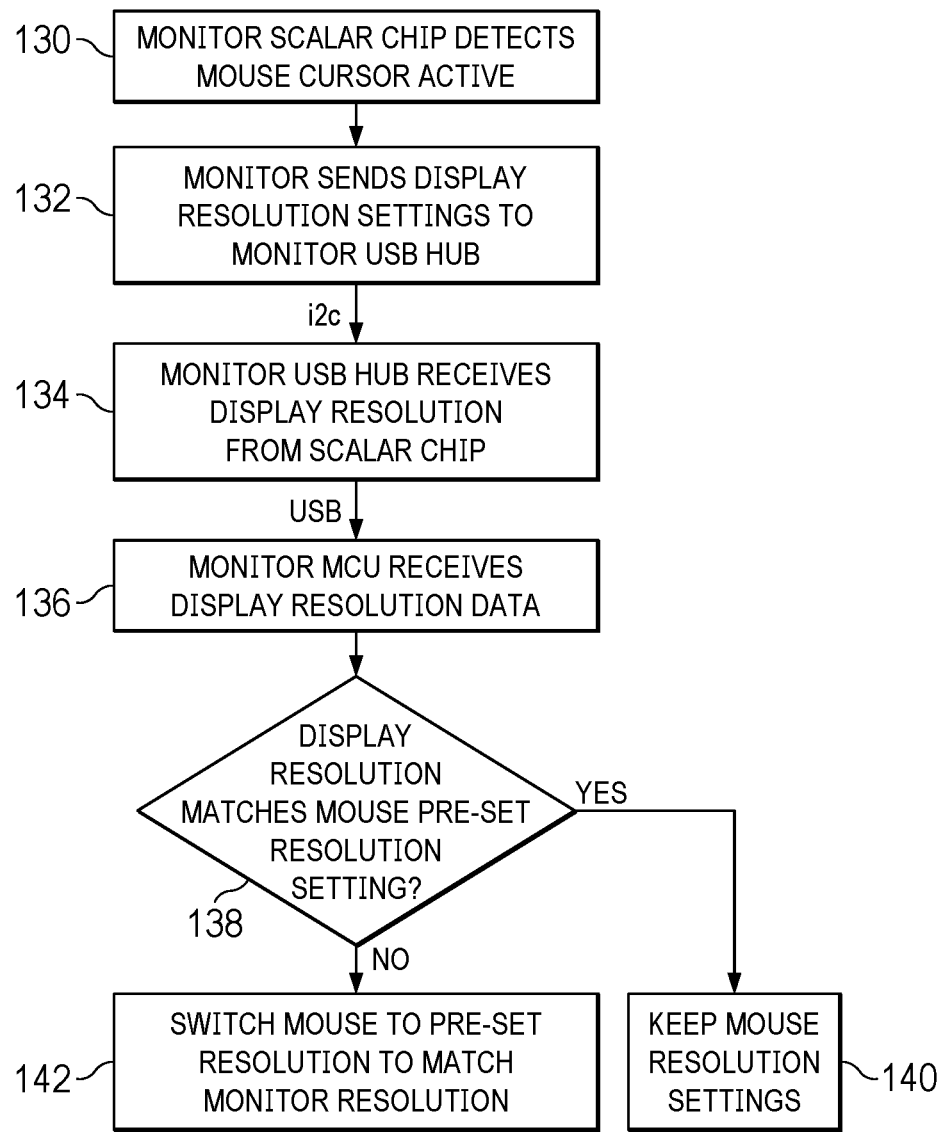
FIG. 6 depicts a flow diagram of a process for managing mouse position sensor resolution at transitions of presentation of the mouse cursor between displays of different resolution.

Referring now to FIG. 6, a flow diagram depicts a process for managing mouse position sensor resolution at transitions of presentation of the mouse cursor between displays of different resolution. The process starts at step 130 when the display scalar integrated circuit detects that a mouse cursor is active at the display. In response, at step 132 the display sends its display resolution settings to the display USB hub or other communication medium. At step 134, the display USB hub receives the display resolution from the scalar, such as through an I2C interface, as both an indication that the mouse cursor is initiated and a value for the display resolution on which the mouse cursor is presented. At step 136, the mouse processing resource receives the display resolution from the USB hub or other communication medium, such as a wireless interface, as both an indication that the mouse cursor is presented at a display and the resolution of the display. At step 138 a determination is made of whether the display resolution matches the position sensor resolution set on the mouse, such as by comparing the display resolution against a table that relates display and position sensor resolutions. If the position sensor resolution matches that called for with the display resolution, the process continues to step 140 to keep the mouse position sensor resolution setting. If the position sensor resolution does not match that called for with the reported display resolution, the process continues to step 142 to command position sensor resolution changed to that associated with the reported display resolution.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory interfaced with the processor and operable to store the instructions and information;
   a controller interfaced with the processor and operable to accept inputs from peripheral devices for communication to the processor; and
   a mouse interfaced with the controller, the mouse having a housing, a processing resource, a non-transitory memory, a position sensor operable to detect movement of the housing as a pointer input to the controller, an indicator light operable to illuminate and a push button operable to detect a button press as a button input to the controller, the non-transitory memory storing instructions that when executed on the processing resource cause position sensor movement detection and push button presses to set illumination of the indicator light.

2. The information handling system of claim 1 wherein:
   the indicator light is exposed at the mouse housing upper surface; and
   the instructions apply the position sensor movement and push button presses to predict hand placement over the indicator light, the indicator light turned off when hand placement is predicted over the indicator light.

3. The information handling system of claim 1 wherein:
   the position sensor movement detection comprises a focused state;
   the push button detects a press; and
   in response to the focused state and the press, the indicator illumination is turned off.

4. The information handling system of claim 3 wherein the instructions in response to the focused state and the press further turn off a mouse resolution illumination light.

5. The information handling system of claim 1 wherein:
   the position sensor movement detection comprises a focused state;
   the push button detects a no press for a predetermined time; and
   in response to the focused state and the no press, the indicator illumination is turned on.

6. The information handling system of claim 5 wherein the instructions in response to the focused state and the no press further turn off a mouse resolution illumination light.

7. The information handling system of claim 1 wherein:
   the position sensor movement detection comprises a focused state and no movement for a predetermined time;
   the push button detects a no press for a predetermined time; and
   in response to the focused state, no movement and the no press, the indicator illumination is turned off and a mouse resolution illumination light is turned off.

8. The information handling system of claim 1 wherein:
   the position sensor movement detection comprises an unfocused state;
   the push button detects a no press for a predetermined time; and
   in response to the unfocused state and the no press, the indicator illumination is turned off and a mouse resolution illumination light is turned on.

9. The information handling system of claim 1 wherein:
   the position sensor movement detection comprises an unfocused state for a predetermined time;
   the push button detects a no press for a predetermined time; and
   in response to the unfocused state and the no press, the indicator illumination is turned off and a mouse resolution illumination light is turned off.

10. A method for managing power consumption at an information handling system mouse, the method comprising:
    associating mouse inputs with a plural type of mouse usage;
    detecting one of the plural types of mouse usage; and
    in response to the detecting the one of the plural types of usage, selectively turning on and off an indicator illuminator exposed at the mouse housing and a resolution illumination light;
    wherein detecting further comprises:
    detecting a non-focus of the mouse position sensor as a mouse usage type for a predetermined time;
    detecting a no mouse input button press for a predetermined time as a mouse usage type; and
    in response to the detected non-focus and no input button press, turning off illumination of a mouse indicator illuminator exposed at the mouse upper surface and turning off illumination of a resolution illumination light.

11. The method of claim 10 further comprising:
    detecting a focus of the mouse position sensor as a mouse usage type;
    detecting a mouse input button press as a mouse usage type; and
    in response to the detected focus and input button press, turning off illumination of a mouse indicator illuminator exposed at the mouse upper surface.

12. The method of claim 11 further comprising:
    in response to the detected focus and input button press, turning off illumination of a resolution illumination light.

13. The method of claim 10 further comprising:
detecting a focus of the mouse position sensor as a mouse usage type;
detecting a no mouse input button press for a predetermined time as a mouse usage type; and
in response to the detected focus and no input button press, turning on illumination of a mouse indicator illuminator exposed at the mouse upper surface.

14. The method of claim 13 further comprising:
in response to the detected focus and input button press, turning off illumination of a resolution illumination light.

15. The method of claim 10 further comprising:
detecting a focus of the mouse position sensor as a mouse usage type;
detecting a no mouse input button press for a predetermined time as a mouse usage type; and
in response to the detected focus and no input button press, turning off illumination of a mouse indicator illuminator exposed at the mouse upper surface and turning off illumination of a resolution illumination light.

16. The method of claim 10 further comprising:
detecting a non-focus of the mouse position sensor as a mouse usage type;
detecting a no mouse input button press for a predetermined time as a mouse usage type; and
in response to the detected non-focus and no input button press, turning off illumination of a mouse indicator illuminator exposed at the mouse upper surface and turning on illumination of a resolution illumination light.

17. A mouse comprising:
a housing having an indicator light exposed at an upper surface;
a processing resource disposed in the housing and operable to execute instructions to process information;
a position sensor interfaced with the processing resource, the position sensor detecting movement of the housing with a resolution illumination light selectively turned on and off;
a push button interfaced with the processing resource and operable to detect a button press with a first and second polling rate; and
a non-transitory memory storing instructions that when executed on the processing resource cause position sensor movement detection and push button presses to set illumination of the indicator light and the resolution illumination light.

18. The mouse of claim 17 wherein the instructions further cause:
detection of a focus and a non-focus of the position sensor;
detection of a press of the push button within a predetermined time period; and
application of the focus and non-focus and the predetermined time to separately command power to the indicator light and the resolution illumination light.

19. The mouse of claim 17 wherein the indicator light comprises a product logo.

\* \* \* \* \*